United States Patent Office 2,801,617
Patented Aug. 6, 1957

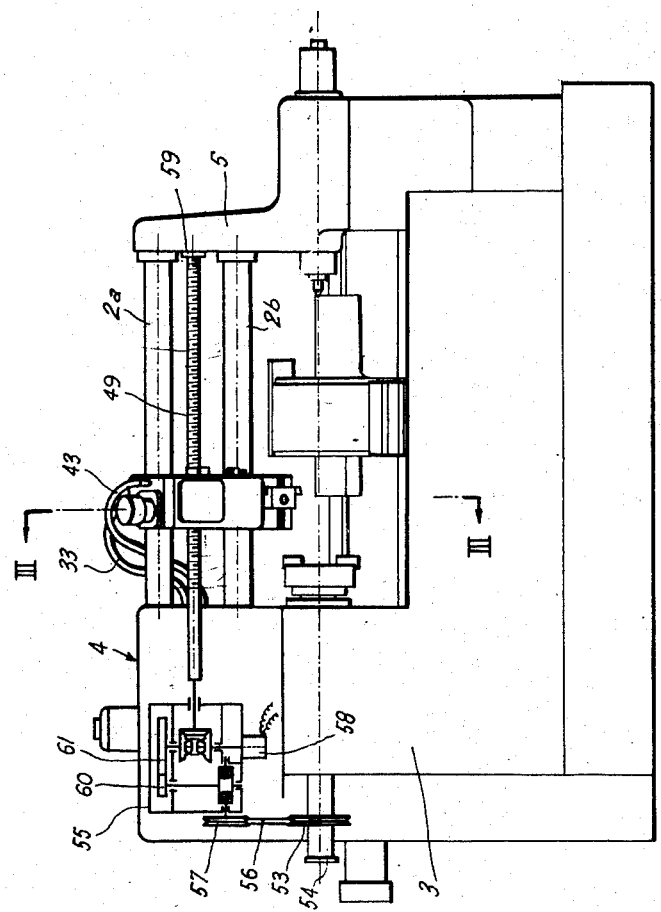
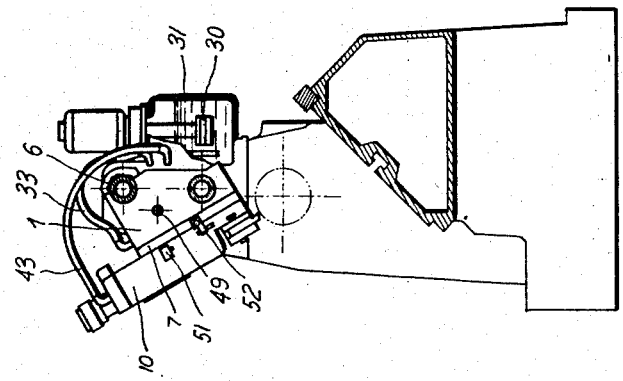

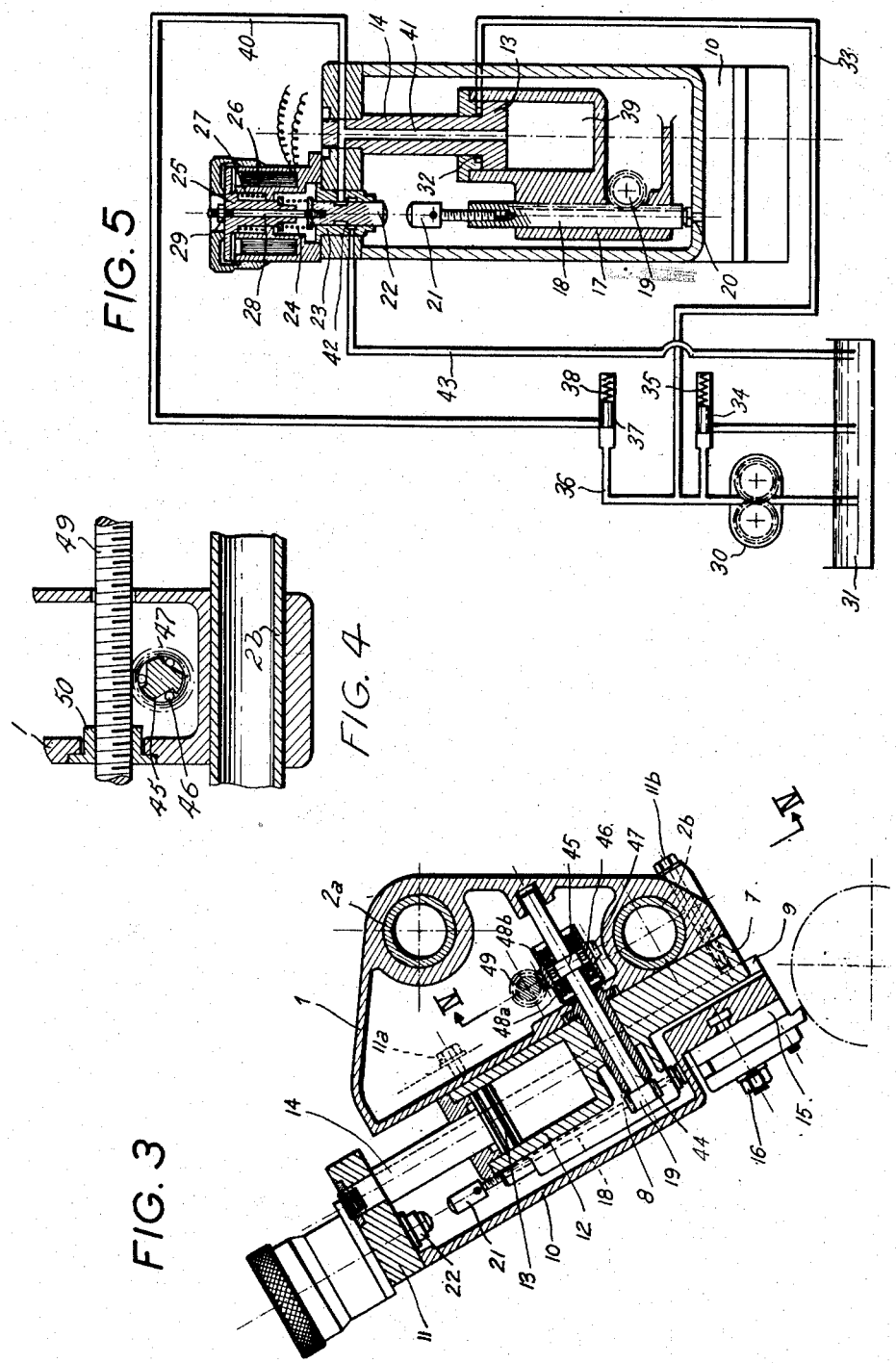

2,801,617

DEVICES FOR THE CONTROL OF THE FEED MOTION OF THE TOOL-CARRIAGE OF A MACHINE TOOL

Armand Marcel Le Lan, Paris, France, assignor, by mesne assignments, to Societe Anonyme H. Ernault-Batignolles, Paris, France, a French company Application June 17, 1953, Serial No. 362,351

Claims priority, application France November 5, 1952

2 Claims. (Cl. 121—41)

This invention relates to machine tools and it has for its object an improvement to the devices controlling the feed motion of a machine of this kind.

The advantages of the hydraulic devices for controlling the tool-carriages of machine tools are well known.

Concurrently with the mechanical, electro-mechanical or other devices, the hydraulic devices offer under a small bulk the requisite qualities of power, speed and almost absolute absence of inertia to movements when working. Moreover, it has already been proposed to release the hydraulic control of the feed in informing it by electro-magnetic devices and controlling it by a mechanical motion practically unaffected by any variation in the resisting force or any difference of viscosity of the motive fluid.

The purpose of the present invention is the application of such devices, in a very simplified form, to the control of the feed motion of a machine tool.

The description which will follow and which concerns the feed control of an auxiliary tool-carriage of a slide lathe is not limiting either in the hydraulic arrangement described in way of example, or in the type of tool-carriage used, it being well understood that such a feed control may be applied to the displacements of any member of a machine requiring a rapid feed motion and a feed motion when working in a single or in two directions of working. The combination of these motions to constitute an operating cycle may be obtained by means of relays and electrical contacting devices.

Referring to the accompanying drawings, which represent in way of example a preferred embodiment of the invention:

Figs. 1 and 2 are a front and a side elevation, respectively, showing, with the general disposition of the parts, the assembly of an auxiliary tool-carriage, called superior tool-carriage attachment, on a manufacturing slide lathe.

Fig. 3 is a longitudinal section of the tool-carriage and of its supports along the plane III—III of Fig. 1, perpendicular to the line of the centres of the lathe.

Fig. 4 is a part section along the plane IV—IV of Fig. 3, showing the meshing of the control motion of the feed of the tool-carriage.

Fig. 5 represents the development of a longitudinal section of the tool-carriage through the principal parts, together with a diagram of the hydraulic control arrangement.

The auxiliary carriage properly-so-called comprises a supporting block 1 carried by two parallel bars 2a, 2b, supported on the one hand on the headstock 3 of the lathe by the housing 4 of the control mechanism and, on the other hand, on a counter-center specially provided to this end.

The supporting block 1 can slide in a parallel direction to the center line on the bars 2a and 2b in order to adjust itself exactly in the required position, and it is adapted to become fixed to them in its working position by the locking of an upper half bearing 6.

A sole plate 7, adjustable in direction and adapted to pivot on a socket 8 fixed to the block 1, carries slide 9 on which rests and slides freely a tool-holder carriage 10.

The locking in position of the sole plate 7 on the block 1 is ensured by screws 11a and 11b.

The sole plate 7 comprises a fixed cylinder 12 in which slides a movable piston 13 the rod of which, 14, is fastened to the tool-holder carriage 10 by a cross-piece 11 fixed to the latter.

The lower portion of the tool-holder carriage is disposed for receiving a tool-holder block 15, locked in position by means of a bolt 16.

The sole plate 7 comprises also (Fig. 5) a housing 17 parallel to the axis of the cylinder, in which housing slides freely a rack 18 meshing with a pinion 19 and butting, in its position of rest, with its lower end, against a stop 20, on the body of the tool-holder carriage. The upper portion of the rack is provided with an adjustable screw 21 permitting to adjust the length of the rapid feed stroke of the tool-holder carriage, as will be described later on.

In axial alignment with the rack 18, a slide valve 22 slides freely in a socket 23 fixed to the cross-piece 11. The valve 22 is constantly urged downwards by a spring 24. On the other hand, the upward withdrawal of this same valve may be caused by the freeing of a movable core 25 of an electromagnet 26, the core 25 being biased upwards by a spring 27. The connection between the valve and the core is ensured, for this movement only, by a threaded rod 28 fixed to the upper end of the valve, passing freely through the core and hooked to the upper part of a latter by the adjusting nut 29. It will be noticed that, in this arrangement, any traction on the core exerted by the electromagnet has for its effect to liberate the valve towards its normal working position.

The hydraulic arrangement, of a known type (Fig. 5) comprises a geared pump 30 pumping oil in a reservoir 31 and constantly feeding an annular space 32 of the cylinder 12 by a pipe 33. The pressure in this annular space is maintained constant by means of a valve 34, balanced by a spring 35. The oil, coming from the pipe 33 through a pipe 36 and passing through a stop valve 37 biased by a spring 38, flows into a chamber 39 through a pipe 40 and a passage 41, which latter passage is bored in the rod 14 of the piston 13. The pressure in the chamber 39 is controlled by an escape edge 42 of the valve 22 permanently urged towards its open position by the spring 24 in the absence of any traction by the rod 28 as it has been described above. The oil then returns to the reservoir by a pipe 43.

The working of the device is a follows:

In the waiting position, represented in Figs. 3 and 5, the carriage 10 is raised to the end of the high stroke of the piston 13. The electromagnet 36 is de-energized and the core 25, liberated and lifted by its spring 27, maintains, by the rod 28, the valve 22 in its position in which it covers the escape edge 42 and completely closes the return pipe 43. The effective pressure in the chamber 39, the cross-section of which is greater than that of the chamber 32, maintains in this way the piston 13 at the end of its high stroke in its cylinder.

When the operative cycle is put in action, the electromagnet 26 is energized, the core is attracted and liberates the valve 22 which, under the action of its spring 24, uncovers widely the return pipe 43 by opening the escape edge 42. As the pressure falls in the chamber 39, the piston 13 descends carrying in its movement the whole of the carriage 10. As soon as the lower end of the valve 22 contacts the screw 21, the escape edge 42 progressively throttles the return pipe 43, the pressure of the oil in the chamber 39 increases and the movement of the piston stops at the moment when the equilibrium between the effective pressures in the two chambers 39 and 32 is achieved.

The reaction of the screw 21 against the valve 22 is transmitted by the rack 18 to the pinion 19, fixed to a spindle 44 which carries a free wheel mechanism comprising a three-slope cam 45 fixed to the spindle 44 and three balls 48, the whole being housed inside a helicoidal toothed wheel 47 carried by bearings 48a and 48b mounted on the spindle 44, the said wheel meshing with an irreversible worm 49 passing through the supporting block 1 and guided in it by a bearing 50.

The direction of the working of the free wheel mechanism is disposed in such a manner that any action exerted from the top down on the rack 18 has for its effect to lock this mechanism by rendering the spindle 44 positively connected with the wheel 47.

On the other hand, this same mechanism does not prevent a rapid lifting of this same rack by the carriage 10 and the stop 20.

The valve 22 having contacted the screw 21, as described above, and the movement of rapid descent of the carriage 10 having come to a stop, any movement of rotation of the screw 49 will be transmitted to the carriage 10 by a corresponding movement from the top to the bottom or from the bottom to the top, according to the selected direction of rotation. As a matter of fact, if by a given rotation of the screw 49 a slackening of the reaction of the rack 18 and of the screw 21 against the valve 22 is brought about, the latter, pushed by its spring 24 will uncover more widely the return pipe 43 by the escape edge 42, the pressure falling in 39, the piston 13 and the whole assemblage of the carriage 10 will move from the top downwards seeking another position of hydraulic equilibrium which will only be satisfied by the stopping of the motion of the rack 18 and of the rotation of the screw 49.

On the other hand, if, by a reverse rotation of the screw 49, a movement from the bottom upwards is imparted to the rack, which, transmitted by the screw 21 to the valve 22 will push in this latter, the escape edge 42 will throttle more the return pipe 43 and, the pressure rising in 39, the piston 13 and the whole of the carriage 10 will move from the bottom upwards seeking another position of hydraulic equilibrium.

According to a known procedure, the movements of the carriage 10, controlled hydraulically, are therefore rigorously controlled by the displacements in the mechanical control of the rack 18, itself controlled by the rotation of the screw 49.

The return of the carriage in its elevated position of start is effected by an electrical contact maker 51 placed on the side of the carriage 10 (Fig. 2) which, in contact with an adjustable stop 52 placed on the sole plate 7, breaks the supply of current to the electromagnet 26. The core 25, pushed back towards the top by its spring 27, draws up the valve 22 by means of the rod 28. The edge of the valve 42 closing in this way completely the return pipe 43, the pressure will rise in 39 and will push back the piston 13 to the end of its high stroke, together with the whole of the carriage 10.

In this movement and as it has been described above, the stop 20 fixed to the carriage 10 will raise again the rack in its starting position.

It is seen therefore that this mechanism allows in succession a rapid feed movement of the tool-holder carriage, a movement of feed while working and a movement of withdrawal or of rapid return. The combination of these movements in a continuous working cycle being rendered possible by the operation of electrical contact makers controlling the supply and the cutting out of an electromagnet.

The Fig. 1 shows the detail of the mechanism of the connection existing between the movement of rotation of the lathe spindle and the command of the motion for the control of the work feed of the auxiliary carriage which has just been described.

To this end, the lathe comprises a driving pulley 53 keyed on the back end of the lathe spindle 54 of the fixed headstock 3 which drives rotatively a mechanical change speed gear box 55 for the feeds by means of a belt 56 and of a driven pulley 57 keyed on the driving shaft of the feed box, the whole being protected by the casing 4.

An electromagnet 58 placed externally on the body of the casing 55 serves for the manual or automatic control of the instantaneous reversal of the rotation of the driven shaft represented by the screw 49 parallel to the guiding bars 2a and 2b passing through the support 1 of the auxiliary carriage through the bearing 50 and resting freely at its end on the support 5 in a bearing 59.

In the train of the transmission members of the feed box, are inserted two removable pinions 60 and 61 serving for adjusting the value of the selected feed.

It is finally to be remarked that the continuous rotation of the screw 49 in the direction corresponding to a working feed of the auxiliary carriage from the top downwards, does not raise any obstacle to the start of the working cycle of this carriage at any moment of the time during which the spindle of the machine is functioning. This advantageous feature is rendered possible by the free wheel mechanism placed in the auxiliary carriage and which has been dealt with above.

This mechanical control mechanism permits therefore to obtain on a carriage driven hydraulically, a working cycle which is entirely automatic comprising rapid movements of approach or of withdrawal of tools, together with feeds while working in both directions of running, the whole under command of the control of the supply to an electromagnet.

What I claim is:

1. In a device for the hydraulic control of the advance movement of a tool-holder carriage of a machine tool having a lead screw operatively associated through said device with said carriage for initiating control of its movement subsequent to the advance thereof, means defining a hydraulic system for controlling said carriage movement including a control valve carried by said tool-holder carriage to be movable therewith and displaceable between controlling positions for controlling flow of hydraulic fluid in said system, an electromagnet operatively connected to said control valve for controlling the displacement thereof, said valve being displaceable when said electromagnet is energized to permit the flow of said hydraulic fluid in said system in a manner to cause a rapid advance movement of said carriage and control valve thereon, a member disposed in the path of movement of said control valve to be operable thereon in at least a portion of said advancing movement and means for ensuring during said portion of said advancing movement a positive connection in a single direction between said lead screw and said member without interruption of the rotation of the lead screw.

2. In a device according to claim 1, wherein said member is a rack meshing with a pinion which connects with the lead screw through the intermediary of a free wheel mechanism.

References Cited in the file of this patent

UNITED STATES PATENTS

| | | |
|---|---|---|
| 2,242,272 | Swan | May 20, 1941 |
| 2,370,580 | Pyne | Feb. 27, 1945 |
| 2,374,774 | Olsen | May 1, 1945 |
| 2,477,108 | Young | July 26, 1949 |
| 2,563,918 | Casella | Aug. 14, 1951 |
| 2,601,157 | Le Lan | June 13, 1952 |
| 2,636,579 | DeHaas | Apr. 28, 1953 |
| 2,656,752 | Kurzweil | Oct. 27, 1953 |